United States Patent
Beaurepaire et al.

(10) Patent No.: US 11,546,724 B2
(45) Date of Patent: Jan. 3, 2023

(54) METHOD, APPARATUS, AND SYSTEM FOR DETERMINING A NON-SPECIFIC LOCATION ACCORDING TO AN OBSERVED MOBILITY PATTERN DERIVED FROM NON-POSITIONING RELATED SENSOR DATA

(71) Applicant: HERE Global B.V., Eindhoven (NL)

(72) Inventors: Jerome Beaurepaire, Berlin (DE); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 203 days.

(21) Appl. No.: 17/117,970

(22) Filed: Dec. 10, 2020

(65) Prior Publication Data

US 2022/0053283 A1    Feb. 17, 2022

Related U.S. Application Data

(60) Provisional application No. 63/064,735, filed on Aug. 12, 2020.

(51) Int. Cl.
*H04W 4/021*    (2018.01)
*H04W 4/02*     (2018.01)
*H04W 4/029*    (2018.01)

(52) U.S. Cl.
CPC ........... *H04W 4/022* (2013.01); *H04W 4/023* (2013.01); *H04W 4/029* (2018.02)

(58) Field of Classification Search
CPC ...... H04W 4/022; H04W 4/023; H04W 4/029

USPC ........................................................ 455/456
See application file for complete search history.

(56) References Cited

U.S. PATENT DOCUMENTS

2017/0039445 A1* 2/2017 Tredoux ............. H04N 5/23254
2018/0245927 A1    8/2018 Frish et al.

FOREIGN PATENT DOCUMENTS

WO    2016018170 A1    2/2016

OTHER PUBLICATIONS

Hua et al., "We Can Track You if You Take the Metro: Tracking Metro Riders Using Accelerometers on Smartphones", May 22, 2015, retrieved on Aug. 13, 2020 from https://arxiv.org/pdf/1505.05958.pdf, pp. 1-13.

(Continued)

*Primary Examiner* — Ted M Wang
(74) *Attorney, Agent, or Firm* — Ditthavong, Steiner & Mlotkowski

(57) ABSTRACT

An approach is disclosed for determining a non-specific device location according to an observed mobility pattern derived from non-positioning related sensors. The approach involves, for example, determining non-positioning related sensor data collected from one or more sensors of a device. The approach also involves processing the non-positioning related sensor data to determine an observed mobility pattern. The approach further involves making a determination that the observed mobility pattern corresponds to reference data associated with a non-specific location, the non-specific location being at a designated location specificity level. Based at least on the determination, the approach further involves providing an output indicating that the device is located at the non-specific location.

20 Claims, 12 Drawing Sheets

(56) References Cited

OTHER PUBLICATIONS

Han et al., "Accomplice: Location Inference Using Accelerometers on Smartphones", retrieved on Aug. 13, 2020 from https://netsec.ethz.ch/publications/papers/han_ACComplice_comsnets12.pdf, 9 pages.
Mosenia et al., "Pinme: Tracking a Smartphone User Around the World", Feb. 5, 2018, retrieved on Aug. 13, 2020 from https://arxiv.org/pdf/1802.01468.pdf, pp. 1-17.

* cited by examiner

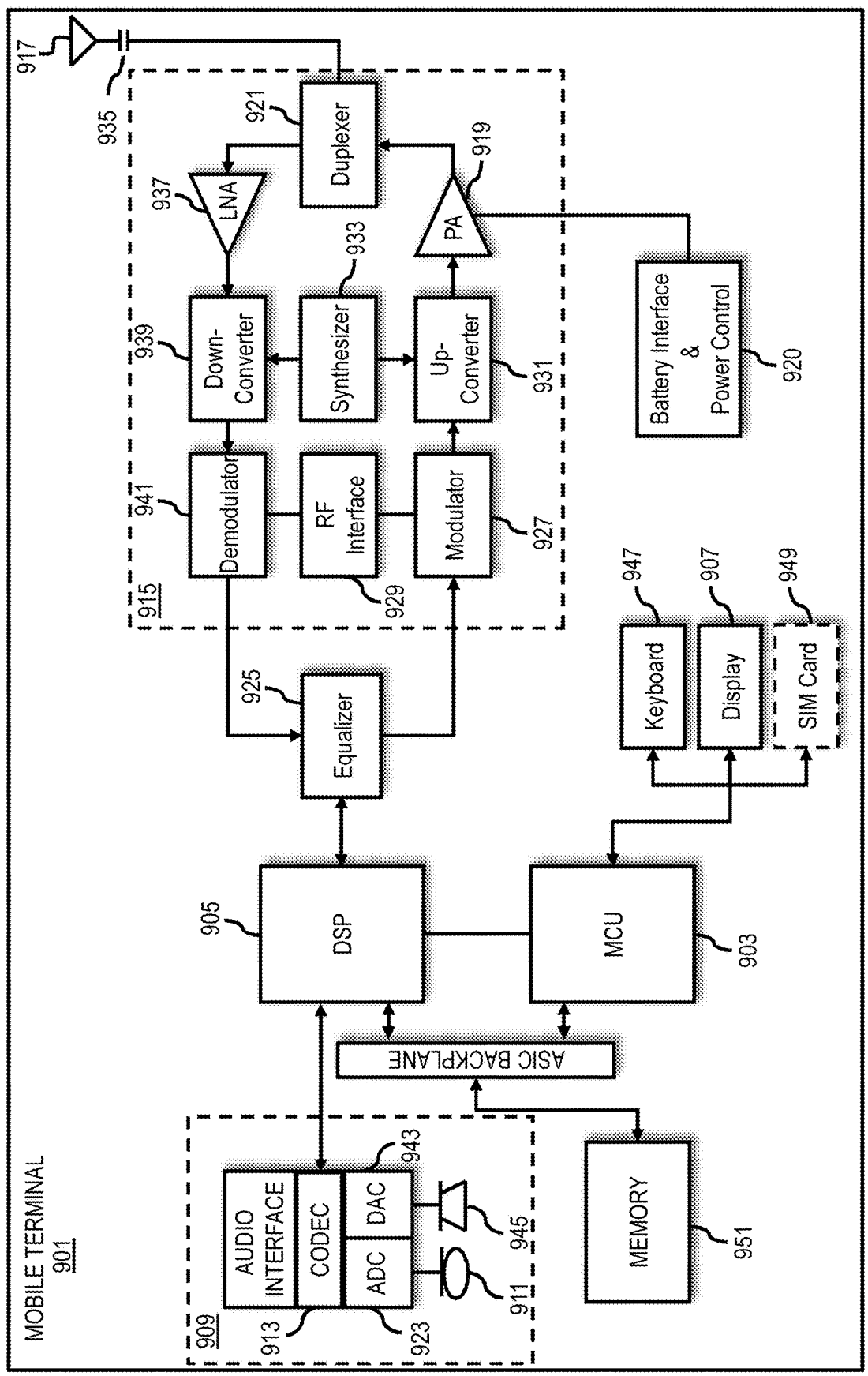

METHOD, APPARATUS, AND SYSTEM FOR DETERMINING A NON-SPECIFIC LOCATION ACCORDING TO AN OBSERVED MOBILITY PATTERN DERIVED FROM NON-POSITIONING RELATED SENSOR DATA

RELATED APPLICATION

This application claims priority from U.S. Provisional Application Ser. No. 63/064,735, entitled "METHOD, APPARATUS, AND SYSTEM FOR DETERMINING A NON-SPECIFIC LOCATION ACCORDING TO AN OBSERVED MOBILITY PATTERN DERIVED FROM NON-POSITIONING RELATED SENSOR DATA," filed on Aug. 12, 2020, the contents of which are hereby incorporated herein in their entirety by this reference.

BACKGROUND

Location-based service providers (e.g., mapping and navigation providers) are continually challenged to provide compelling services and applications. One area of development relates to providing consumers contextually relevant services based on user positioning (e.g., location-based services, promotions, offers, advertisements, etc.). For example, such services may include information or insights related to a nearby point of interest (POI) (e.g., an address, a telephone number, hours of operation, etc.); information or insights related to a nearby means or modes of transportation (e.g., a bus schedule, an available shared vehicle, a cost saving promotion, etc.); or the like. However, current systems often require a user to opt in or to allow such services to access sensitive user location data in exchange for providing such information or insights. Moreover, the growing pervasiveness of such services and corresponding encroachment on user privacy, particularly location privacy, is leading many users to opt out and/or to disable location services associated with their mobile devices. Accordingly, service providers face significant technical challenges to provide users contextually relevant services while protecting a user's privacy, particularly location privacy.

SOME EXAMPLE EMBODIMENTS

Therefore, there is a need for an approach for determining a non-specific device location while taking a user's location privacy into account.

According to one embodiment, a method comprises determining non-positioning related sensor data collected from one or more sensors of a device. The method also comprises processing the non-positioning related sensor data to determine an observed mobility pattern. The method further comprises selecting a recommended vehicle, a recommended mode of vehicle operation, or a combination thereof based on the respective energy-efficiency scores. The method further comprises making a determination that the observed mobility pattern corresponds to reference data associated with a non-specific location, the non-specific location being at a designated location specificity level. Based at least on the determination, the method further comprises providing an output indicating that the device is located at the non-specific location.

According to another embodiment, an apparatus comprises at least one processor, and at least one memory including computer program code for one or more computer programs, the at least one memory and the computer program code configured to, with the at least one processor, cause, at least in part, the apparatus to determine non-positioning related sensor data collected from one or more sensors of a device. The apparatus is also caused to process the non-positioning related sensor data to determine an observed mobility pattern. The apparatus is further caused to make a determination that the observed mobility pattern corresponds to reference data associated with a non-specific location, the non-specific location being at a designated location specificity level. Based at least on the determination, the apparatus is further caused to provide an output indicating that the device is located at the non-specific location.

According to another embodiment, a non-transitory computer-readable storage medium having stored thereon one or more program instructions which, when executed by one or more processors, cause, at least in part, an apparatus to determine non-positioning related sensor data collected from one or more sensors of a device. The apparatus is also caused to process the non-positioning related sensor data to determine an observed mobility pattern. The apparatus is further caused to make a determination that the observed mobility pattern corresponds to one or more reference mobility patterns previously associated with a non-specific location, the non-specific location being at a designated location specificity level. Based at least on the determination, the apparatus is further caused to provide an output indicating that the device is located at the non-specific location.

According to another embodiment, an apparatus comprises means for determining non-positioning related sensor data collected from one or more sensors of a device. The apparatus also comprises means for processing the non-positioning related sensor data to determine an observed mobility pattern. The apparatus further comprises means for making a determination that the observed mobility pattern corresponds to reference data associated with a non-specific location, the non-specific location being at a designated location specificity level. Based on the determination, the apparatus further comprises means for providing an output indicating that the device is located at the non-specific location.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 9 is a diagram of a mobile terminal (e.g., handset or vehicle or part thereof) that can be used to implement example embodiment(s).

DESCRIPTION OF SOME EMBODIMENTS

Examples of a method, apparatus, and computer program for determining a non-specific device location according to an observed mobility pattern derived from non-positioning related sensors are disclosed. In the following description, for the purposes of explanation, numerous specific details are set forth to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form to avoid unnecessarily obscuring the embodiments of the invention.

Figure 1:
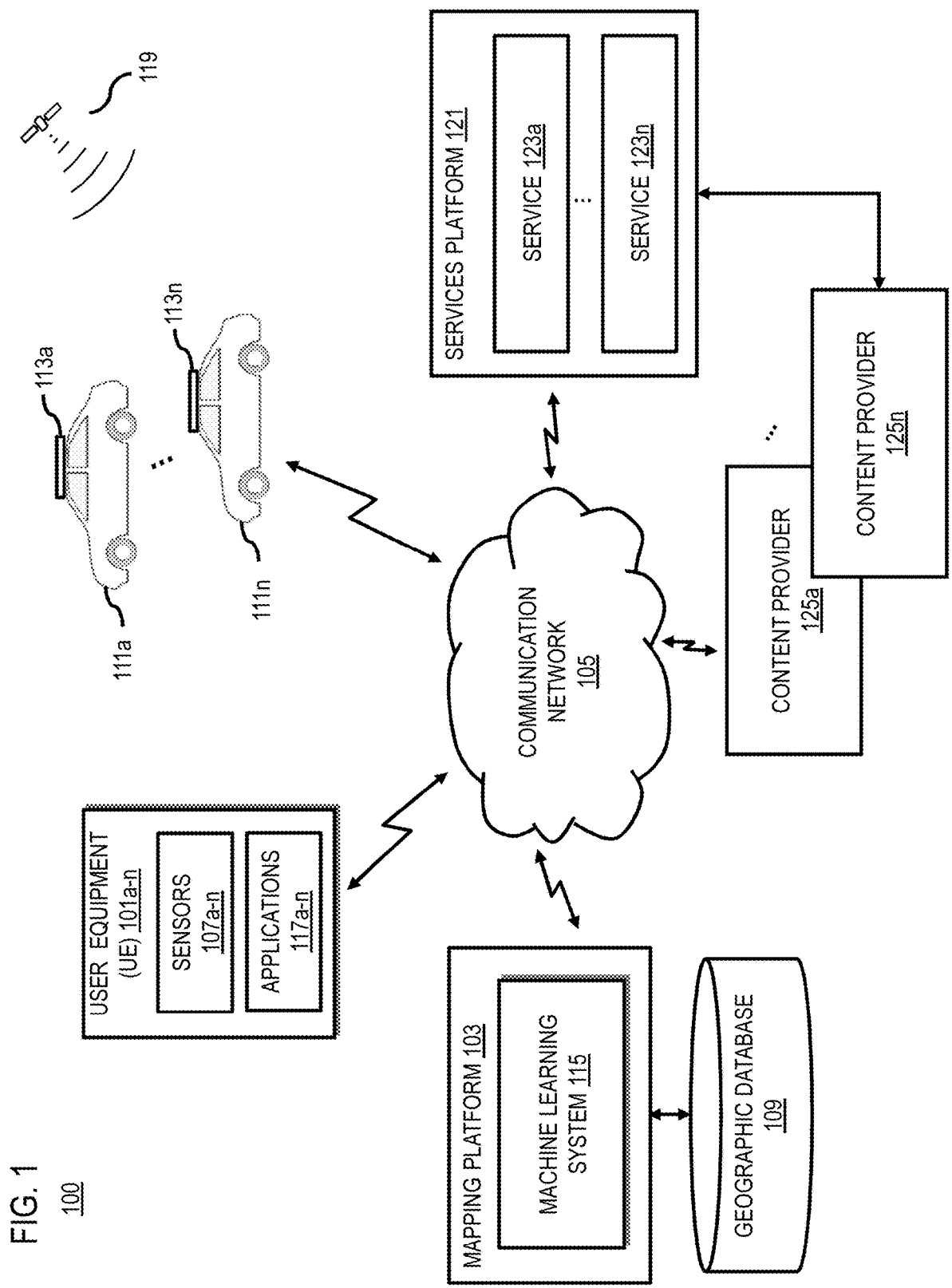
FIG. 1 is a diagram of a system capable of determining a non-specific device location according to an observed mobility pattern derived from non-positioning related sensors, according to example embodiment(s)

FIG. 1 is a diagram of a system capable of determining a non-specific device location according to an observed mobility pattern derived from non-positioning related sensors, according to example embodiment(s). As described above, location-based service providers (e.g., mapping and navigation providers) are continually challenged to provide compelling services and applications. One area of development relates to providing consumers contextually relevant services based on user positioning (e.g., location-based services, promotions, offers, advertisements, etc.). For example, such services may include information or insights related to a nearby POI (e.g., an address, a telephone number, ratings, reviews, hours of operation, etc.), information or insights related to nearby means or modes of transportation (e.g., a bus schedule, an available shared vehicle, a cost saving promotion, etc.), or the like.

Current systems often rely on relatively precise positioning to provide contextually relevant services and may determine such information based on various known positioning methods, online and offline, indoors and outdoors; user positioning using sensor fusion, etc. However, the growing pervasiveness of such services and the corresponding encroachment on user privacy, particularly location privacy, is increasingly raising privacy concerns among users. Consequently, many users are opting out and/or are disabling location services associated with their mobile devices (e.g., a smartphone), which can lead to imprecise user positioning and/or the provision of inaccurate information or insights. For example, without the benefit of location services, a service provider may provide a user with an advertisement or an offer for a POI or a means or mode of transportation that is inconvenient for the user to reach or to use. Consequently, the provided information or insights are likely to be perceived as a distraction or a nuisance, thereby negatively impacting user experience. Accordingly, service providers face significant technical challenges to provide users contextually relevant services while protecting a user's privacy, particularly location privacy.

To address these technical problems, a system 100 of FIG. 1 introduces a capability to determine a non-specific device location according to an observed mobility pattern derived from non-positioning related sensors, according to example embodiment(s). In one instance, based on the non-specific device location, the system 100 can provide contextually relevant services (although less accurate) to a user while preserving the user's precise location and/or privacy (e.g., when the user has disabled all location services on a mobile phone or other mobile device). In one embodiment, when the usual location services are turned off, the system 100 can leverage other device sensors (e.g., accelerometer, barometer, gyroscope, etc.) to determine a non-specific device location (e.g., within a city, a district, a neighborhood, etc.). In one instance, if the system 100 detects similar mobility patterns between a given user's non-positioning related sensor data and previously recorded sensor data (e.g., preferably collected with Global Navigation Satellite System (GNSS)-based location reference for the best quality), then the system 100 can with high confidence output the non-specific location or area (e.g., a city) that the user is likely at or within. In one embodiment, the system 100 can then provide or deliver, for example, user-triggered relatively personalized services (e.g., location-based services, promotions, offers, ads, marketing, etc.) that are location dependent (e.g., within a designated location specificity level) and, therefore, useful without knowing or revealing the user's exact position.

In one embodiment, the system 100 of FIG. 1 can collect non-positioning related sensor data from one or more user equipment (UE) 101a-101n (also collectively referred to herein as UEs 101) (e.g., a mobile device, a smartphone, a smartwatch, etc.) having connectivity to the mapping platform 103 via the communication network 105 and including one or more device sensors 107a-107n (also collectively referred to herein as device sensors 107). In one instance, non-positioning related sensor data refers to signals that do not convert directly to latitude/longitude (lat/long) (e.g., accelerometer or gyroscope signals) and these signals are unlike, for example, GNSS-based location signals which can provide a precise position. In one embodiment, the non-positioning related sensor data may also include signals like transactional information coming from a UE 101 (e.g., a near-field communication (NFC) payment). The system 100 can also, for example, store the collected non-positioning related sensor data in the geographic database 109 without converting it to direct user lat/long as is the traditional course of action. In one instance, the system 100 can collect non-positioning related sensor data from multiple UEs 101 that can complement each other (e.g., a smartphone and a smartwatch). By way of example, the device sensors 107 may include one or more of the following:

Accelerometer;
Barometer;
Gyroscope;
Magnetometer;
Light sensors;
Camera sensors;
Raw radio sensors;
Sound sensors; or
Health related sensors (e.g., heart, oxygen, etc.).

In one embodiment, the system 100 can compare the collected non-positioning related sensor data with crowd-sourced data sets, existing map data models, and/or area specific mobility patterns (e.g., vehicular traffic patterns) stored in or accessed via the geographic database 109. In one instance, when similar mobility patterns are detected by the system 100 between a given user's non-positioning related sensor data and previously recorded data (e.g., digital map data, crowdsourced data, GNSS data, etc.), then the system 100 can with high confidence output the area (e.g., a city) that the user is likely in. In one embodiment, the system 100 is able to detect similar mobility patterns based on the fact that most areas (e.g., a city) have a specific layout with recognizable patterns based on one or more of the following: road types and geometries; building types, heights, and attributes; and variously populated areas, etc. In one instance, an area of interest may be based on a non-specific location (e.g., a city, a district, a neighborhood, etc.), features or characteristics of the area (e.g., an urban area with subways, a rural area with few roads, etc.), or a combination thereof.

Figure 2:
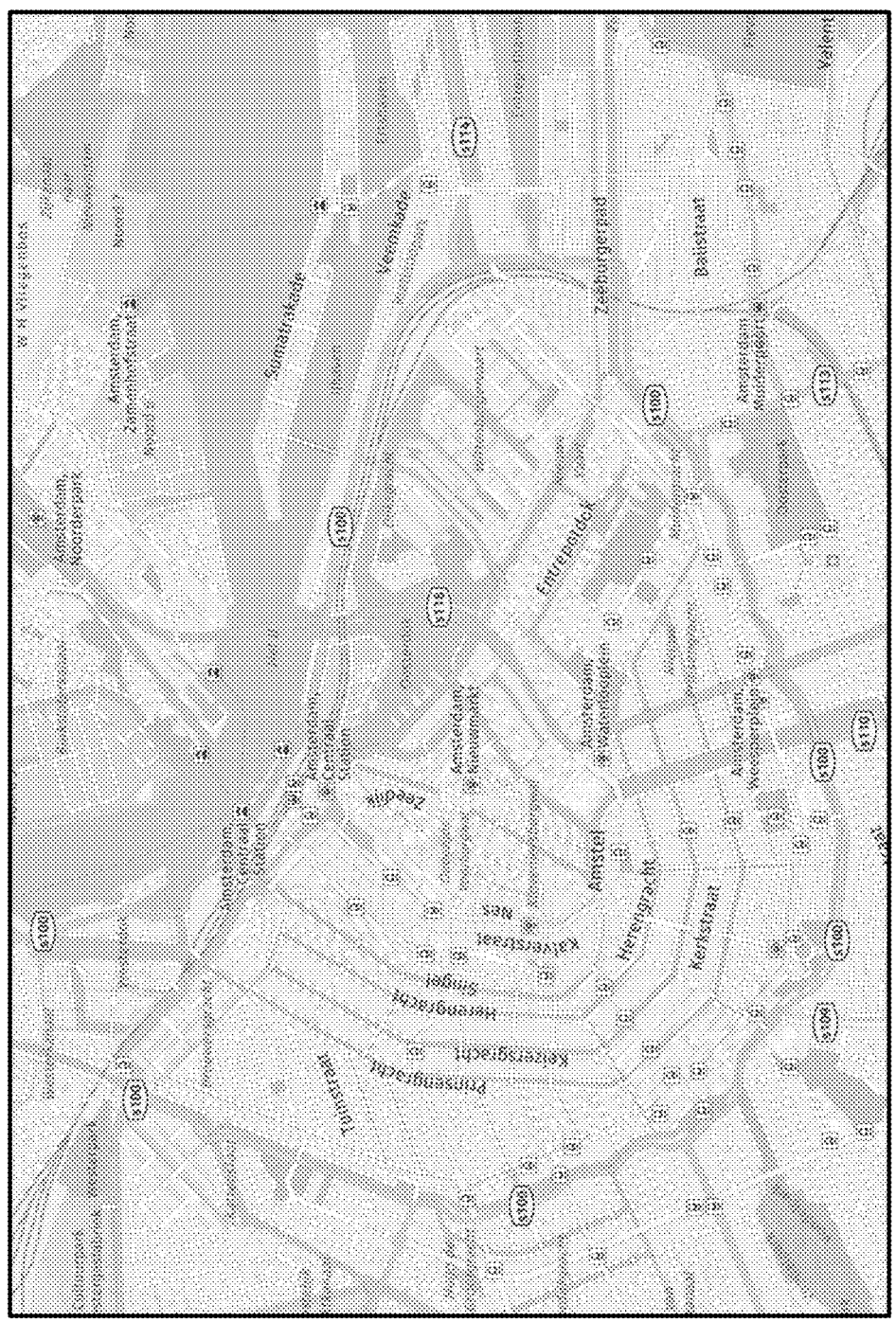
FIG. 2 is an illustrative example of an area with a specific layout and recognizable mobile patterns.

In one embodiment, the system 100 can use digital maps (e.g., stored in or accessed via the geographic database 109) and the related attributes (e.g., vehicular and pedestrian traffic patterns) as the primary element of comparison between a user's non-positioning related sensor data (e.g., collected from device sensors 107) and a given area due to the area's unique layouts and attributes. It is contemplated that the higher the quality of the map data is for an area, the more precise the system 100 can predict the non-specific location of the user and/or the UE 101 (e.g., a mobile device, a smartphone, etc.). An illustrative example of a non-specific location 200 with a specific layout and recognizable mobility patterns (e.g., Amsterdam) is depicted in FIG. 2.

In one instance, the system 100 can compare a user's non-positioning related sensor data against mobility data collected from other users (e.g., crowd-sourced data sets). In one instance, the system 100 can analyze and compare the non-positioning related sensor data (e.g., traces) against other known traces of other users or devices (e.g., UEs 101) which are known by the system 100 to be located in a specific area, city, etc. (e.g., based on one or more map matching techniques). Consequently, the system 100 can identify possible matches between portions of traces (e.g., the input trace and the known traces) to compute a level of confidence identifying the "match" between a user's non-positioning related sensor data and crowd-sourced data, leading the system 100 to identify the most probable area/city. In one embodiment, the known traces (e.g., stored in or accessed via the geographic database 109) include all relevant transport modes, which the system 100 can leverage to increase the confidence level that a user is in a given area (e.g., a city).

In one instance, the system 100 can compare the crowd-sourced reference tracks (e.g., stored in or accessed via the geographic database 109) and the new sample tracks (e.g., collected from a user's device sensors 107) as follows:

$L_j = \Pi_i \alpha_i \Pi_j A_i(s-r_j)$, where i=sensor type index j=reference track index $L_j$=likelihood of the sample track being the j-th reference track $\alpha_i$=weight of the sensor type in the final likelihood s=sample track $r_j$=j-th reference track $A_i$=metric function for sensor type In one embodiment, the system 100 can analyze each track over the different sensor types and multiply over the likelihoods (probabilities) to find the best match. By way of example, a sensor type could be a "subway station sensor" (e.g., accelerometer detecting an acceleration/deceleration pattern). In one instance, the metrics used by the system 100 can then be simply:

exp (−[number of detected stations in the same track−number of detected stations in the j-th ref track)

In one embodiment, if the system 100 determines that the number of stations matches, then the function gives 1 and if the system 100 determines that there is a mismatch of one or more stations, then the function gives 1/e and so on.

In one embodiment, the system 100 can compute a ranked list of potential areas (e.g., cities) matching the uploaded traces (e.g., crowdsourced data stored in or accessed via the geographic database 109). By way of example, in one example use case, the system 100 may record the following non-positioning related sensor data for a given user:

Barometer indicating a floor change from level 20 to 0→user leaving his apartment to go to the ground floor;
Accelerometer estimated that user walked 400 meters (m) in the direction of southeast→walking to the subway;
Accelerometer detecting 80 steps going down→reaching the subway platform;
Accelerometer detecting 5 accelerations and 5 decelerations→5 stops on the line;
Accelerometer detecting 60 steps going up→reaching the street level;
Accelerometer estimated that user walked 250 m in the direction of north east→reaching the office; and
Barometer indicating a floor change from level 0 to 7→reaching the office.

In one instance, with such non-positioning related sensor data uploaded to a cloud (e.g., the mapping platform 103), the system 100 can compare these mobility patterns to one or more known or recorded mobility patterns (e.g., stored in or accessed via the geographic database 109) as well as to all the possible areas that would "match" such sensor descriptions. In one embodiment, the system 100 can rank the list of potential areas based on a match likelihood, probability, confidence level, or a combination thereof. For example, the system 100 can determine that the ranked list of cities corresponding to the example sensor data may be as follows: (1) Frankfurt (85%), (2) Shanghai (75%), and (3) New York (65%). In one instance, the system 100 can determine a correlation between a non-specific location where a user is waiting with possible POI information available for a candidate location (like the average dwell time) to rank the candidate locations/cities that a user could be in. For example, if there are bus stations in an area where the user may be waiting or if there are retail POIs in an area where an NFC payment may have been detected, the system 100 can rank this candidate location relatively high. In one embodiment, the system 100 can then use the ranked listed or probabilities to deliver relatively personalized or contextually relevant offers to the user (e.g., via a UE 101) based on the prediction, the location, or a combination thereof. In one instance, the system 100 can deliver relatively personalized services based on a specific area (e.g., Miami) or a location characteristic (e.g., population density, climate, currency, etc.).

In one embodiment, the system 100 can use the ranked list or computed probabilities to predict that the user does not live in a city (e.g., the user may live in a suburb, a rural area, a village, etc.). In one instance, the system 100 can determine that a user (e.g., based on a UE 101) does not live in a city based on the measurements of the cellular signals and the computed size of cells in non-urban environments (e.g., stored in or accessed via the geographic database 109), among other factors.

In one instance, the system 100 can regularly update the ranked lists or computed probabilities (e.g., using the machine learning system 115) based on the collection and uploading of new sensor data (e.g., GNSS data, global positioning system (GPS) data, etc.). In one instance, the system 100 can collect or access new sensor data unrelated to the user from a UE 101 (e.g., via the device sensors 107), one or more vehicles 111a-111n (also collectively referred to herein as vehicles 111) (e.g., standard vehicles, autonomous vehicles, semi-autonomous vehicles, etc.), the geographic database 109, or a combination thereof. In one embodiment, the vehicles 111 have connectivity to the mapping platform 103 via the communication network 105 and include one or more vehicle sensors 113 (also collectively referred to herein as vehicle sensors 113) (e.g., camera sensors, GPS sensors, Light Detection and Ranging (LiDAR), etc.). In one instance, the system 100 can collect the new sensor data associated with the vehicles 111 via the vehicle sensors 113, a UE 101 associated with a vehicle 111 (e.g., an embedded navigation system), or a combination thereof.

In one instance, the system 100 can compare a user's non-positioning related sensor data against known mobility patterns online (e.g., via the communication network 105) and/or offline (e.g., based on offline digital maps). In one embodiment, one or more applications 117a-117 (also collectively referred to herein as applications 117) of the UEs 101 would require and be allowed to use the user's non-specific location without sending data to an external server (e.g., the mapping platform 103) via the communication network 105. In one instance, the system 100 can pre-cache some of the area specific mobility patterns or characteristics in the offline map data on a mobile client (e.g., an application 117) to enable computation on a UE 101 itself.

Figure 3:
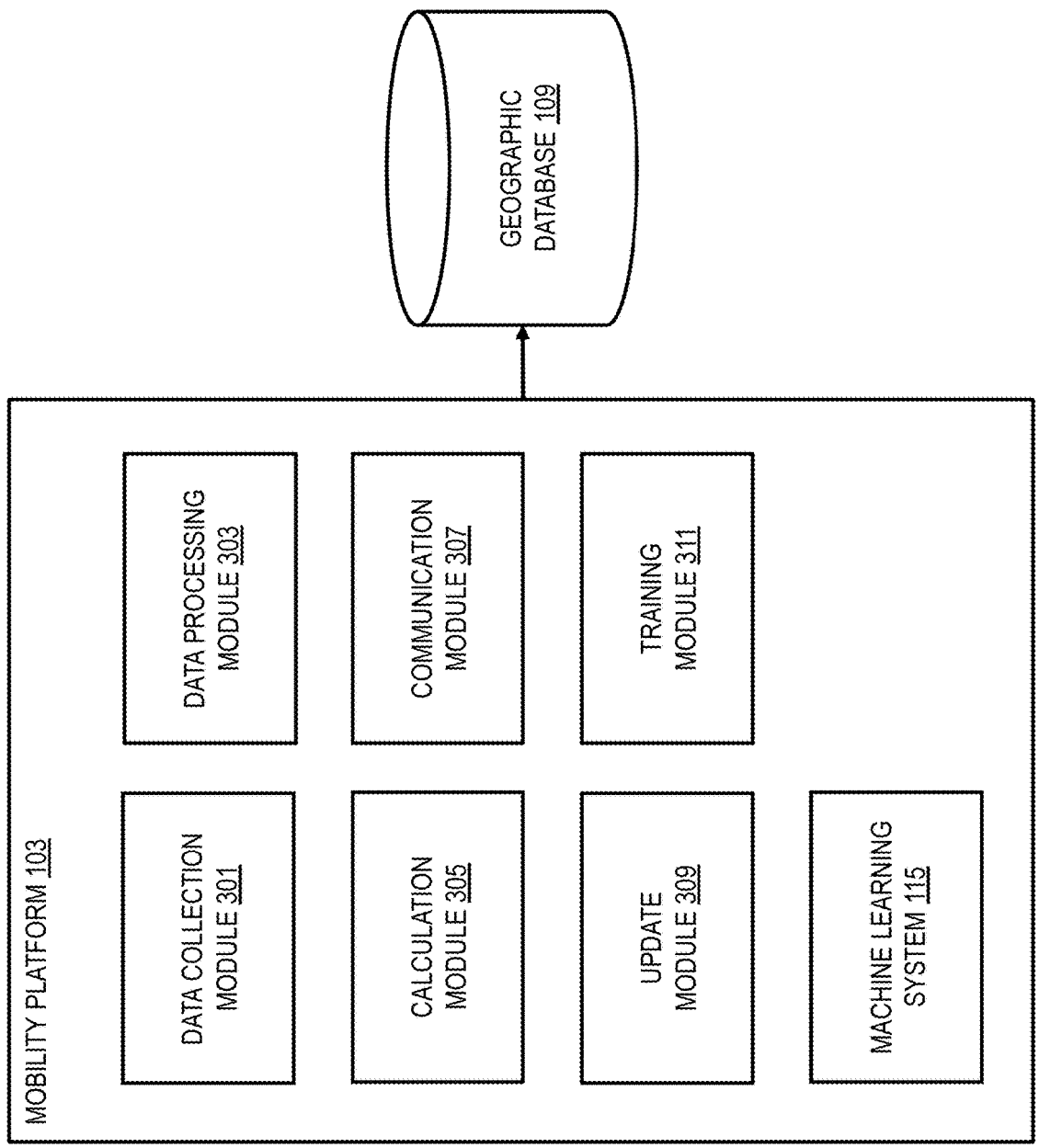
FIG. 3 is a diagram of the components of a mapping platform, according to example embodiment(s)

FIG. 3 is a diagram of the components of the mapping platform 103, according to example embodiment(s). By way of example, the mapping platform 103 includes one or more components for determining a non-specific device location according to an observed mobility pattern derived from non-positioning related sensors, according to the example embodiment(s) described herein. It is contemplated that the functions of these components may be combined or performed by other components of equivalent functionality. In one embodiment, the mapping platform 103 includes a data collection module 301, a data processing module 303, a calculation module 305, a communication module 307, an update module 309, a training module 311, and the machine learning system 115, and has connectivity to the geographic database 109. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100. In another embodiment, the mapping platform 103, the machine learning system 115, and/or the modules 301-311 may be implemented as a cloud-based service, local service, native application, or combination thereof. The functions of the mapping platform 103, the machine learning system 115, and/or the modules 301-311 are discussed with respect to FIG. 4.

Figure 4:
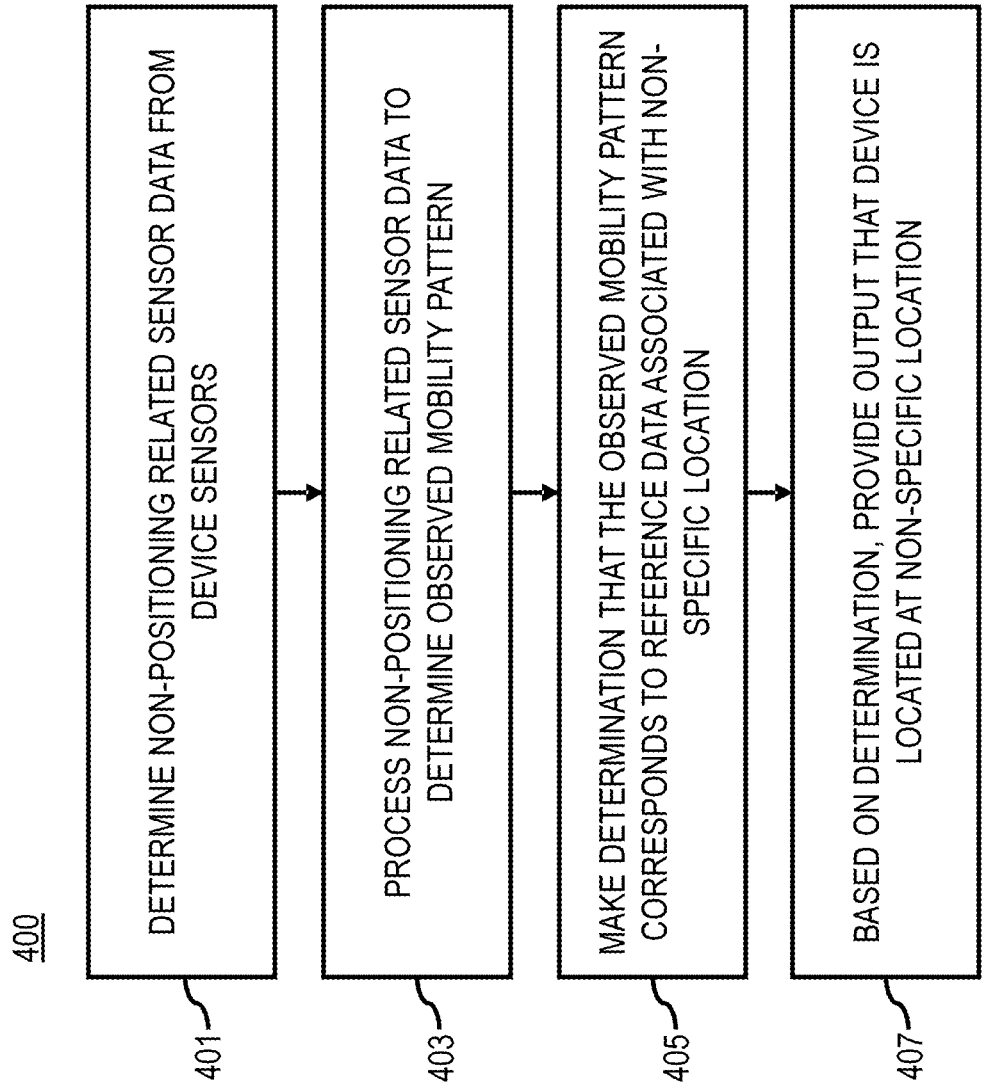
FIG. 4 is a flowchart of a process for determining a non-specific device location according to an observed mobility pattern derived from non-positioning related sensors, according to example embodiment(s)
Figure 8:
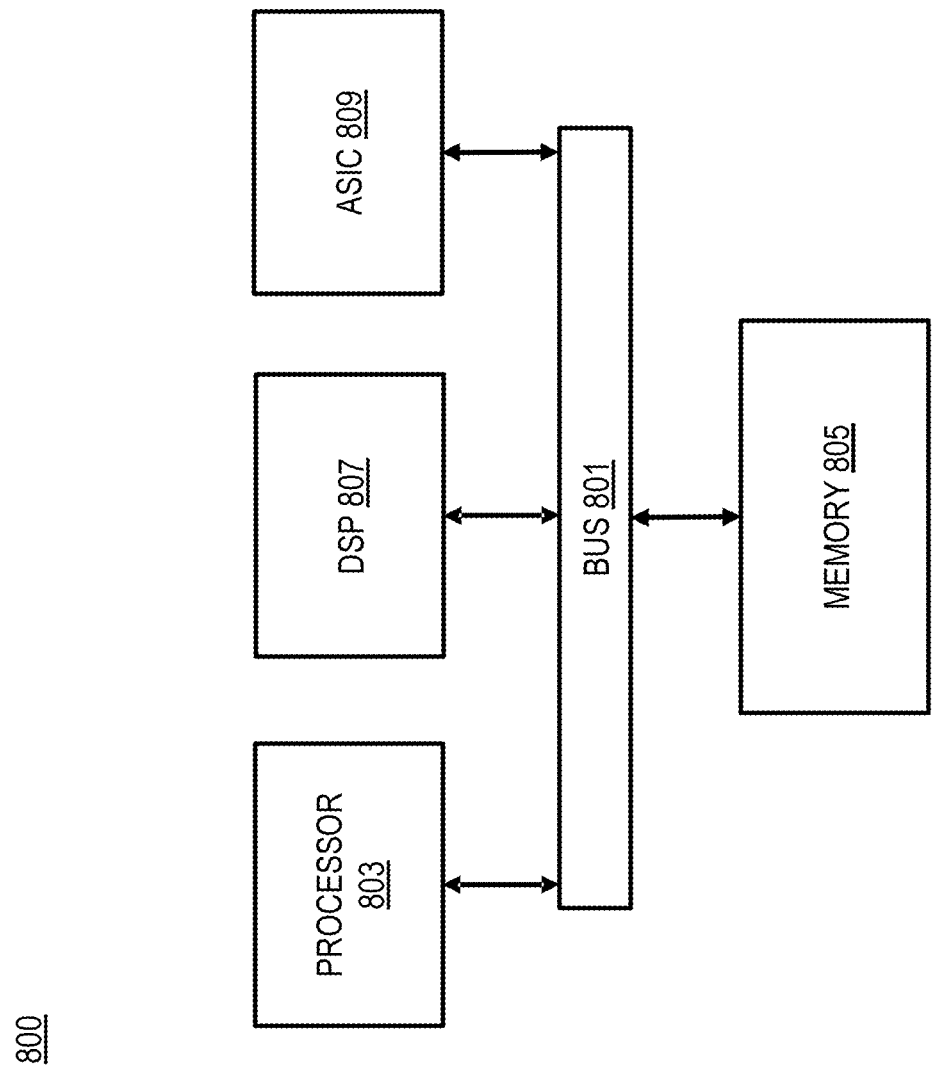
FIG. 8 is a diagram of a chip set that can be used to implement example embodiment(s)

FIG. 4 is a flowchart of a process for determining a non-specific device location according to an observed mobility pattern derived from non-positioning related sensors, according to example embodiment(s). In various embodiments, the mapping platform 103, the machine learning system 115, and/or any of the modules 301-311 may perform one or more portions of the process 400 and may be implemented in, for instance, a chip set including a processor and a memory as shown in FIG. 8. As such, the mapping platform 103, the machine learning system 115, and/or the modules 301-311 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In step 401, the data collection module 301 can determine non-positioning related sensor data collected from one or more sensors of a device (e.g., a mobile device 101, a smartphone 101, etc.). In one embodiment, the non-positioning related sensor data can refer to signals that do not convert directly to lat/long (e.g., sensor data derived from an accelerometer or a barometer) and may be unlike GNSS data that corresponds to a precise location. In one instance, the one or more sensors of a device may be device sensors 107, vehicle sensors 113, or a combination thereof. By way of example, the device sensors 107 and/or the vehicle sensors 113 may comprise an accelerometer, a barometer, a gyroscope, a magnetometer, a light sensor, a camera sensor, a sound sensor, a health sensor (e.g., heart rate, oxygen, etc.), etc. In one embodiment, the data collection module 301 can determine the non-positioning related sensor data by collecting or accessing data from a device sensor 107, a vehicle sensor 113, the geographic database 109, or a combination thereof in real-time, periodically, at any frequency requested by a user, etc. In one instance, the data collection module 301 can determine the non-positioning related sensor data from multiple UEs 101 in a complimentary manner (e.g., a smartphone and a smartwatch; a mobile device and an embedded navigation system; etc.).

In step 403, the data processing module 303 can process the non-positioning related sensor data to determine an observed mobility pattern. By way of example, an observed mobility pattern can be determined by the data processing module 303 based on movement or travel of a device sensor 107, a vehicle sensor 113, or a combination thereof within an area (e.g., a city) over time. In one instance, the data processing module 303 can determine the observed mobility pattern based on a user's mobility graph. For example, the data processing module 303 may process non-positioning related sensor data such as a barometer 107 indicating a floor change from level 20 to 0; an accelerometer 107 estimating that a user walked 400 m in the direction of south east; an accelerometer 107 detecting 5 accelerations and 5 decelerations (e.g., stops on a train); etc. In one instance, the data processing module 303 can combine the various signals or traces corresponding to a user's non-positioning related sensor data into an observed mobility pattern.

In step 405, the calculation module 305 can make a determination that the observed mobility pattern corresponds to reference data associated with a non-specific location, the non-specific location being at a designated location specificity level. In one embodiment, the non-specific location being at a designated location specificity level comprises the non-specific location being designated at a city-level, a district-level, or a neighborhood-level. In one instance, the non-specific location data represents one or more of a location name or a location category. By way of example, a location name can be a specific city (e.g., Berlin, Paris, New York), a specific district or neighborhood (e.g., West Village New York, Old Montreal, etc.), etc. A location category, for example, can correspond to geographic related information (e.g., urban, rural, seaside, etc.), transportation related information (e.g., a pedestrian only area, automobile only area, etc.), population density related information (e.g., dense, sparse, etc.), climate related information (e.g., typically warm, cold, etc.), or a combination thereof.

In one embodiment, the reference data (e.g., stored in or accessed via the geographic database 109) includes one or more reference mobility patterns previously associated with the non-specific location (e.g., a city, a district, a neighborhood, etc.). Like the observed mobility patterns, the reference mobility patterns can be based on movement or travel of a device sensor 107, a vehicle sensor 113, or a combination thereof within an area (e.g., a city) over time. In one instance, the one or more reference mobility patterns correspond with recognizable patterns of an area. For example, most cities have a specific or unique layout with recognizable patterns based on the road types and geometries; building types, heights, and attributes; variously populated areas; etc. By way of example, a reference mobility pattern may correspond to a user with a UE 101 (e.g., a mobile device) taking an underground subway or an elevated tram and/or riding up and down in an elevator of a skyscraper or supertall tower. In both examples, the reference mobility pattern may be based on respective combinations of accelerometer 107 and barometer 107 signals. In another example, a reference mobility pattern may correspond to a user traveling through a tunnel as a driver or passenger of a vehicle 111. In this example, the reference mobility pattern may be based on a combination of accelerometer 107/113 and light sensor 107/113 signals.

In one instance, the one or more reference mobility patterns (e.g., stored in or accessed via the geographic database 109) are crowd-sourced from one or more other devices associated with the non-specific location, traveling in a geographic area associated with the non-specific location, or a combination thereof. By way of example, the one or more other devices can be a UE 101 associated with a user (e.g., a smartphone), a UE 101 associated with a vehicle 111 (e.g., an embedded navigation system), a vehicle 111 (e.g., a standard vehicle, an autonomous vehicle), etc. In one instance, reference data, the one or more reference mobility patterns, or a combination thereof are collected (e.g., by the data collection module 301) and then stored (e.g., in the geographic database 109).

In one embodiment, the reference data includes map data associated with the non-specific location, wherein the map data includes road data, building data, traffic data, other map feature data, or a combination thereof. In one embodiment, the calculation module 305 can use the map data and the related attributes as the primary element of comparison between the observed mobility pattern and the non-specific location due to area specific layouts and attributes. In one instance, the precision of the calculation module 305's determinations are relative to the quality of the map data available for an area.

In one embodiment, the calculation module 305 can determine the non-specific location by matching the observed mobility pattern to at least one of the one or more reference mobility patterns. In other words, the calculation module 305 can determine that the observed mobility pattern corresponds to or matches the reference data and/or the reference mobility patterns previously associated with the non-specific location. In one instance, if the reference data includes map data, then the calculation module 305 can determine the non-specific location by matching the observed mobility pattern to a mobility pattern represented by the map data (e.g., based on the area specific layout and attributes).

In one instance, the calculation module 305 can compute a ranked list of one or more candidate non-specific locations (e.g., cities) based at least on the determination that the observed mobility pattern corresponds to reference data associated with a non-specific location, and then determine the non-specific location from the ranked list. In one embodiment, the calculation module 305 can also compute probability data for the observed mobility pattern corresponding to the reference data, and then determine the non-specific location based on the probability data. For example, following the example described above, the calculation module 305 can compute a ranked list of non-specific locations (e.g., cities) including Frankfurt, Shanghai, and New York. Alternatively or in addition, the calculation module 305 can also compute probability or likelihood data for each non-specific location, for example, Frankfurt 85%, Shanghai 75%, and New York 65%. In one embodiment, the calculation module 305 can determine that the observed mobility pattern corresponds to or matches reference data associated with a non-specific location (e.g., Frankfurt) based on that non-specific location exceeding a threshold probability (e.g., 80%).

In one embodiment, the training module 311 and the machine learning system 115 can select and/or update respective weights or weighting schemes used by the calculation module 305 to generate the ranked list of candidate non-specific locations, probability data, or a combination thereof. In one instance, the training module 311 can continuously provide and/or update a machine learning module (e.g., a support vector machine (SVM), neural network, decision tree, etc.) of the machine learning system 115 during training using, for instance, supervised deep convolution networks or equivalents. By way of example, the training module 311 can train a machine learning model using the respective weights or weight schemes of the matching criteria to enable the calculation module 305 to most efficiently determine a correspondence or a match between an observed mobility pattern and a non-specific location (e.g., a city, a district, a neighborhood, etc.).

In step 407, the communication module 307 can, based at least on the determination, provide an output indicating that a device (e.g., a UE 101, a vehicle 111, or a combination thereof) is located at a non-specific location (e.g., a city, a district, a neighborhood, etc.). In one embodiment, the output may be used (e.g., by a service provider) to provide a personalized service (e.g., location-based services, contextually relevant promotions, offers, advertisements, etc.). In one instance, a personalized service requires a location at least at a certain location specificity level (e.g., to ensure contextual relevancy) and the designated location specificity level meets the certain location specificity level. In other words, the personalized service (e.g., a shared vehicle 111 promotion) may require, for example, at least a city level specificity and the calculation module 305 can determine the non-specific location at least at that specificity level. In this way, the communication module 307 can provide a user the shared vehicle 111 promotion, for example, which may be possibly less contextually relevant than if the user's location services were turned on, but still contextually relevant nevertheless; protect the user's precise location (i.e., ensure location privacy), and can overcome a challenge of providing users contextually related services location when locations services are disabled.

In one embodiment, the update module 309 can update the non-specific location (e.g., a city) based on new non-positioning related sensor data collected (e.g., by the data collection module 301) from the one or more sensors of a device (e.g., device sensors 107, vehicle sensors 113, or a combination thereof), new reference data associated with the non-specific location (e.g., stored in or accessed via the geographic database 109), or a combination thereof. In one instance, the update module 309 in connection with the training module 311 can also provide and/or update the machine learning system 115 based on the new non-positioning related sensor data, new reference data, or a combination thereof to improve and/or ensure a threshold accuracy of determining the non-specific location.

Figure 5A:
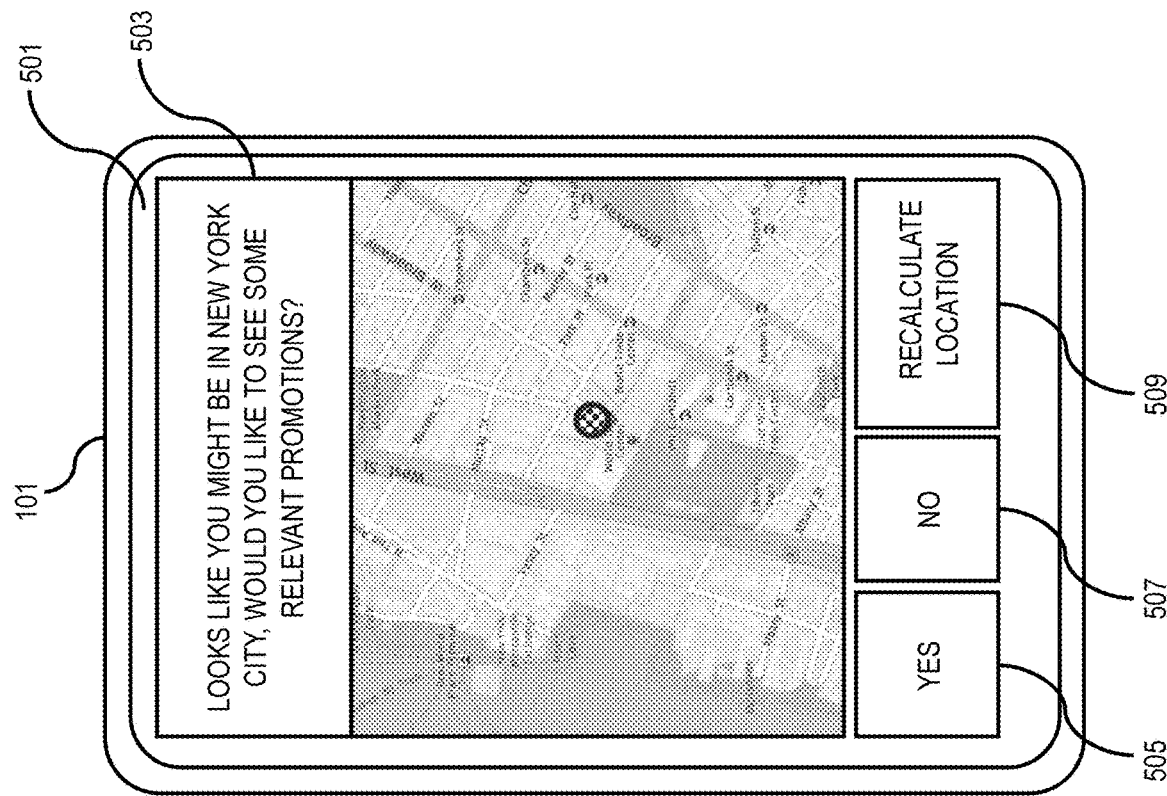
FIGS. 5A through 5D are diagrams of example user interfaces for determining a non-specific device location according to an observed mobility pattern derived from non-positioning related sensors, according to example embodiment(s)

FIGS. 5A through 5D are diagrams of example user interfaces capable of determining a non-specific device location according to an observed mobility pattern derived from non-positioning related sensors, according to example embodiment(s). Referring to FIG. 5A, in one embodiment, the system 100 generates a user interface (UI) 501 (e.g., a navigation application 117) for a UE 101 (e.g., a mobile device, a smartphone, etc.) that can enable a user to receive user-triggered personalized services (e.g., location-based services, promotions, offers, advertisements, etc.) which are location dependent without having to reveal the user's exact position. As such, the user can benefit from contextually relevant offers versus getting "random" offers that may not be location specific.

In one embodiment, the system 100 can determine according to the various embodiments described herein that a user is likely located in either New York or Chicago based on the non-positioning related sensor data collected from a UE 101 (e.g., a smartphone). By way of example, a tourist may be traveling in an area (e.g., a city, a district, a neighborhood, etc.) and wants to maximize battery life, for example, by turning off or disabling location services of the UE 101, but still may be interested in receiving contextually relevant information or insights for the area. In one embodiment, the system 100 can determine that the non-positioning related sensor data (e.g., barometer 107 and accelerometer 107 data) from the UE 101 matches previously recorded data from other users taking an elevator up and down at least 90 floors. In the United States, only New York and Chicago have buildings of this size. In addition, the system 100 can determine that the non-positioning related sensor data (e.g., accelerometer 107 data) from the UE 101 is consistent with taking a ferry or a river boat as a means or mode of transportation. In this instance, both the One World Trade Center (104 floors) in New York and the Willis Tower (108 floors) in Chicago are relatively close to a ferry or a water taxi. Thus, the system 100 can determine with relatively high confidence that the user is in one of these two cities while also protecting the user's precise location and/or privacy.

In one embodiment, the system 100 can generate the UI 501 such that it generates a notification or prompt 503 (e.g., "Looks like you might be in New York City, would you like to see some relevant promotions?") when a user triggers the system 100 to deliver personalized services to the user. For example, the system 100 may be triggered when the predicted location is determined by the system 100 to be above a threshold rank or threshold probability (e.g., >80%). In one instance, the system 100 can generate the UI 501 such that it includes inputs 505 (e.g., "yes"), 507 (e.g., "no"), and 509 (e.g., "recalculate location") to enable a user to agree or disagree to receive contextually relevant services (e.g., location-based advertisements or promotions) from the system 100 as well as to inform the system 100 that the predicted location is inaccurate. For example, the system 100 may then identify the next ranked area (e.g., city) on the ranked list. In one embodiment, the system 100 generates the UI 501 such that a user can interact with all generated inputs (e.g., 505, 507, 509, and the like) via one or more physical interactions (e.g., a touch, a tap, a gesture, typing, etc.), one or more voice commands (e.g., "yes, I am in New York City"), or a combination thereof.

Figure 5B:
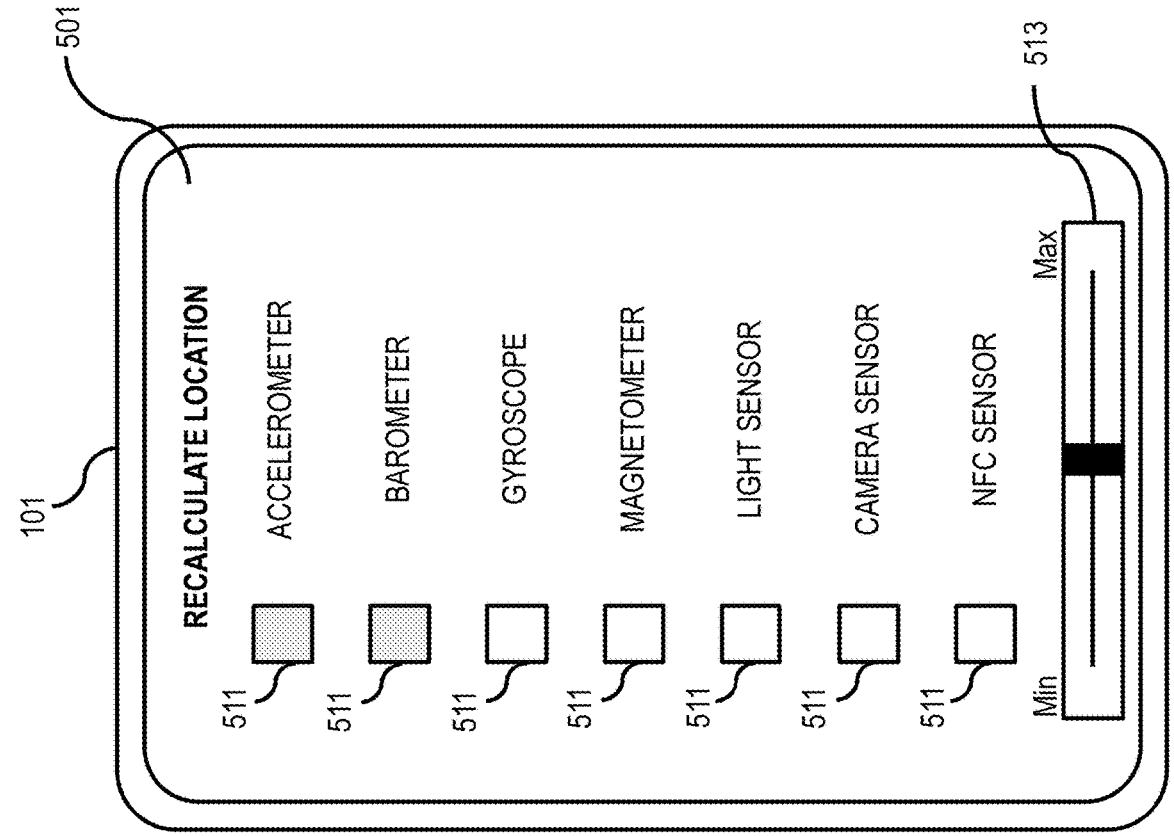

Referring to FIG. 5B, in the example where the system 100 determines a user interaction with input 509 (e.g., based on a wrong predicted location), the system 100 can generate the UI 501 such that the user can adjust and/or customize the one or more non-positioning related sensors 107 that the system 100 collects data from to potentially more accurately compare or match the user's observed mobility pattern with crowdsourced data sets, existing map data models, area specific mobility patterns (e.g., stored in or accessed via the geographic database 109), or a combination thereof. In one embodiment, the system 100 can generate the UI 501 such that it includes an input 511 to toggle on or off the various non-positioning related sensors 107 (e.g., accelerometer, barometer, gyroscope, magnetometer, light sensor, camera sensor, NFC sensor, etc.). By way of example, by minimizing the number of non-positioning related sensors 107 activated (e.g., accelerometer and barometer), the system 100 may minimize computation time and/or resources as well as possibly increase battery life; however, in instances where the system 100 predicts the wrong location, additional sensors 107 may improve prediction accuracy. For example, the system 100 could determine whether any NFC payments associated with the UE 101 align with any known point-of-sale, automatic teller machine (ATM), etc. locations in an area (e.g., as represented on a digital map stored in or accessed via the geographic database 109). Similarly, the system 100 could determine whether any camera sensors 107 were activated at any well-known camera point of views. In another example, the system 100 could determine whether any activity of the magnetometer 107 corresponds to any known protected building entrances (e.g., where users are required to pass through a metal detector to gain entrance to the building).

In one embodiment, the system 100 can generate the UI 501 such that it includes an input 513 (e.g., "min" and "max") to adjust the scope or sensitivity of the system 100's search for recorded mobility patterns (e.g., crowdsourced patterns). By way of example, the "min" setting may represent a maximum sensitivity but relatively limited scope (e.g., a neighborhood) and the "max" setting may represent a minimum sensitivity but relatively broad scope (e.g., a city). In one embodiment, the system 100 can automatically determine the most advantageous mix of sensors 107 and sensitivity levels based on a calculated confidence threshold, probability threshold, etc. to ensure a likelihood of finding a match that exceeds the threshold.

Figure 5C:
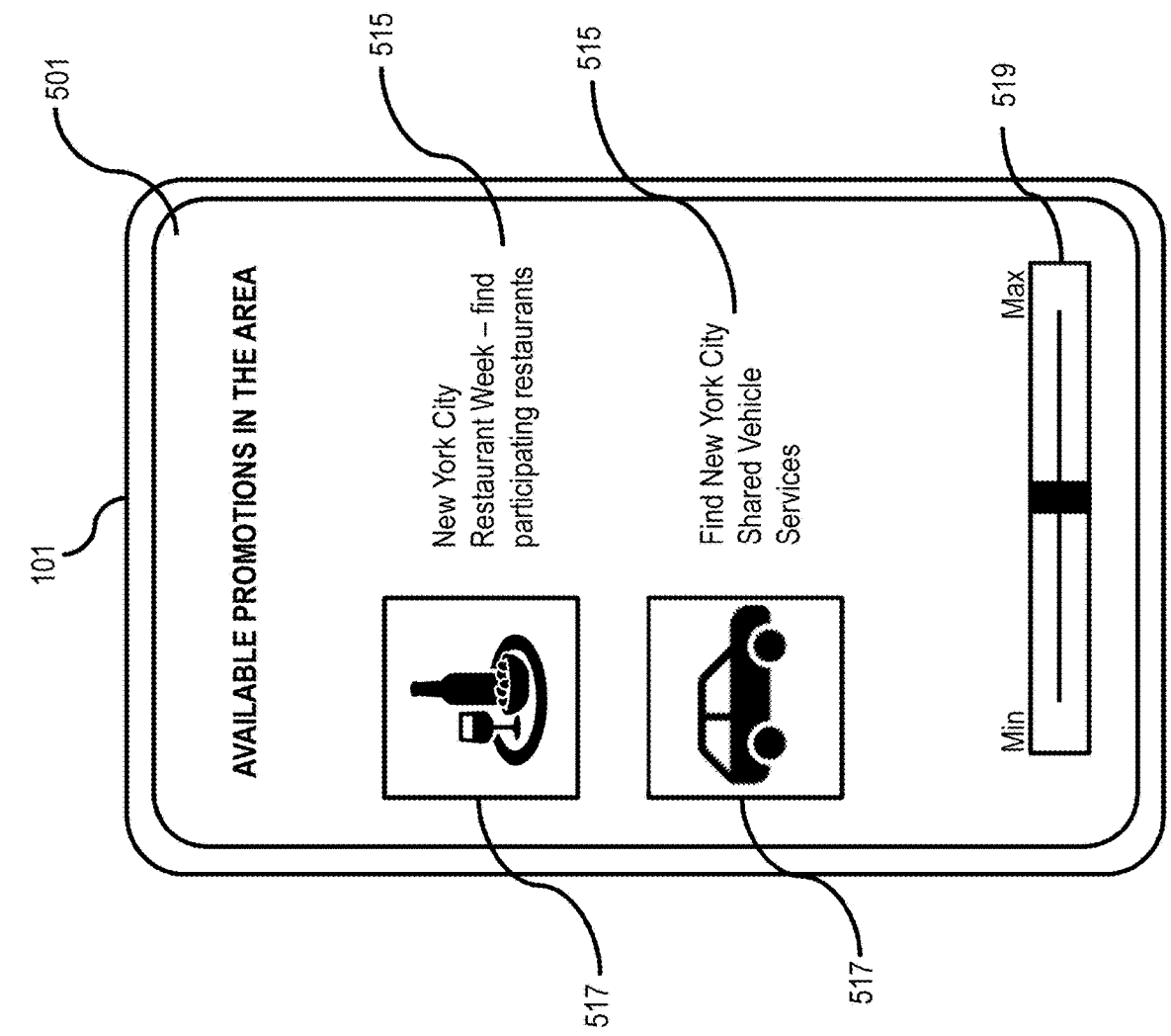

Referring to FIG. 5C, in one embodiment, the system 100 can use the information about the likely area (e.g., a city, a district, a neighborhood, etc.) in which the user is located to deliver personalized offers (e.g., "available promotions,") respecting user privacy, even when the user has turned off all location services on the UE 101. In one instance, the system 100 can generate the UI 501 such that it includes notifications 515 (e.g., "New York City Restaurant Week—find participating restaurants" and "Find New York City Shared Vehicle Services") and corresponding inputs 517 to initiate the acceptance of suggested personalized services. In one embodiment, the system 100 can also generate the UI 501 such that it includes the input 519 to increase or decrease the geographic boundaries or parameters (e.g., neighborhood, district, city, state, etc.) corresponding to the previously recorded mobility patterns (e.g., stored in or accessed via the geographic database 109) to find more specific or less specific offers depending on a user's particular interests and/or desired level of privacy.

Figure 5D:
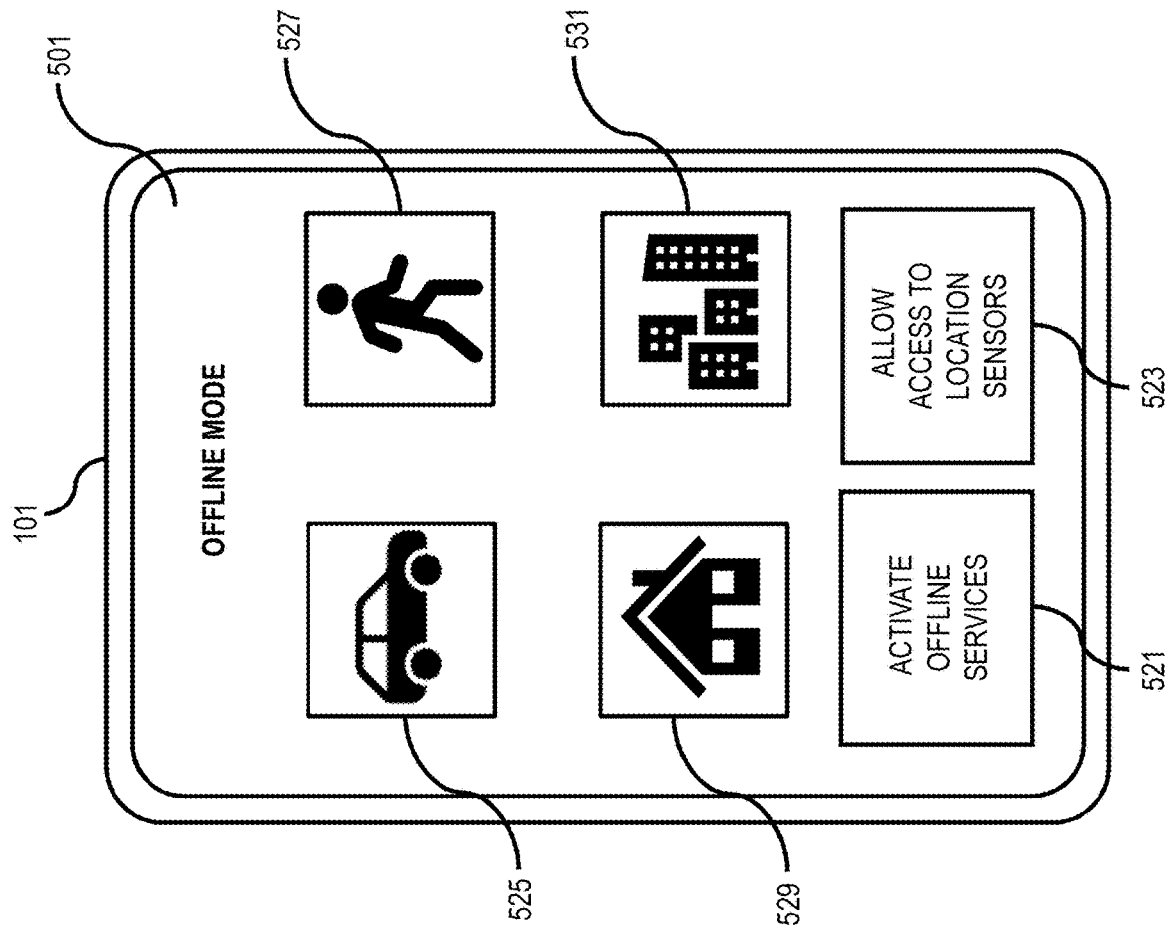

Referring to FIG. 5D, in one embodiment, the system 100 can generate the UI 501 such that it includes inputs 521 (e.g., "activate offline services") and 523 (e.g., "allow access to location sensors") to enable the system 100 to leverage map data, mobility pattern data, or a combination thereof during an offline mode of the UE 101. In this example, an application 117 (e.g., a navigation application) would require the user's non-specific location (e.g., based on an interaction with input 523) but could do so without sending data (e.g., GPS data) to an external server (e.g., the mapping platform 103), thereby still protecting a user's precise location. In one instance, the system 100 can generate the UI 501 such that it includes inputs 525 (e.g., vehicle), 527 (e.g., pedestrian), 529 (e.g., residential), and 531 (e.g., business) to enable a user to cause the system 100 to pre-cache types of area specific mobility patterns or characteristics in the offline map data on the UE 101 to make offline comparisons possible on the UE 101 itself. In one embodiment, the system 100 can generate the inputs 525, 527, 529, and 531 such that a user could use one or more of the inputs to voluntarily share one or more of the respective observed mobility patterns (e.g., anonymized) with the system 100 once the UE 101 comes back online to increase the overall accuracy of the system 100's prediction ability. It is contemplated that such voluntary actions could be incentivized (e.g., making certain contextually relevant promotions or offers only available to individuals that volunteer data).

Returning to FIG. 1, in one embodiment, the UEs 101 (e.g., a mobile device, a smartphone, etc.) may be associated with a user (e.g., a pedestrian, a tourist, a driver, a passenger, etc.) or with a vehicle 111 (e.g., an embedded navigation system). By way of example, the UEs 101 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles 111 or any combination thereof, including the accessories and peripherals of these devices, or any combination thereof. It is also contemplated that a UE 101 can support any type of interface to the user (such as "wearable" circuitry, etc.). In one embodiment, the vehicles 111 may have cellular or wireless fidelity (Wi-Fi) connection either through the inbuilt communication equipment or from a UE 101 associated with the vehicles 111. Also, the UEs 101 may be configured to access the communication network 105 by way of any known or still developing communication protocols. In one embodiment, the UEs 101 may include the mapping platform 103 to determine a non-specific device location according to an observed mobility pattern derived from non-positioning related sensors.

In one embodiment, the UEs 101 include device sensors 107 (e.g., a multi-axial accelerometer, barometer, gyroscope, magnetometer, light sensors, camera sensors, a front facing camera, a rear facing camera, sound sensors, height sensors, tilt sensors, moisture sensors, pressure sensors, NFC sensors, wireless network sensors, GPS sensors, etc.) and applications 117 (e.g., mapping applications, navigation applications, review or recommendation applications, shared vehicle booking or reservation applications, public transportation timetable applications, POI-based applications, etc.). In one embodiment, the GPS sensors 107 (when user allowed) can enable the UEs 101 to obtain geographic coordinates from satellites 119 for determining current or live location and time. Further, a user location within an area may be determined by a triangulation system such as A-GPS, Cell of Origin, or other location extrapolation technologies when cellular or network signals are available.

In one embodiment, the mapping platform 103 performs the process for determining a non-specific device location according to an observed mobility pattern derived from non-positioning related sensors (e.g., device sensors 107) as discussed with respect to the various embodiments described herein. In one embodiment, the mapping platform 103 can be a standalone server or a component of another device with connectivity to the communication network 105. For example, the component can be part of an edge computing network where remote computing devices (not shown) are installed along or within proximity of an intended destination (e.g., a city center).

In one embodiment, the machine learning system 115 of the mapping platform 103 includes a neural network or other machine learning system to compute a ranked list of potential areas (e.g., a city, a district, a neighborhood, etc.) matching the non-positioning related sensor data collected by the system 100 from a UE 101 (e.g., a mobile device, a smartphone, etc.). In one instance, the machine learning system 115 may compute the ranked list based on the likelihood (probability) that the non-positioning related sensor data matches the predicted area (e.g., based on previously recorded mobility patterns). In one embodiment, the machine learning system 115 can select and/or update the respective weights or weighting schemes related to the non-positioning related sensor data, map and related attribute data, crowdsourced mobility patterns and related data, etc. For example, the machine learning system 115 can assign relatively greater weight to patterns corresponding to GNSS-based data; one or more mobility patterns that are unique to an area (e.g., barometer signals indicating a floor change from 0 to over 80-90 floors); patterns corresponding to accelerometer and barometer sensor data versus matches corresponding to light sensor and sound sensor data, etc. For example, the accelerometer and barometer sensor data for an area may generate a more unique mobility pattern compared to a the light sensor and/or sound sensor data for the same area, thus increasing the probability that the system 100 will determine the correct area with a high degree of confidence. In one instance, the machine learning system 115 may also assign relatively more weight to relatively more recent recorded mobility patterns (e.g., older patterns may no longer accurately identify an area).

In one embodiment, the machine learning system 115 can iteratively improve the speed and accuracy by which the system 100 compares non-positioning related sensor data from a UE 101 (e.g., a mobile device, a smartphone, etc.) with crowdsourced data sets, existing map data models, and/or area specific mobility patterns. Similarly, in one instance, the machine learning system 115 can iteratively improve the speed and accuracy by which the system 100 generates ranked lists of areas (e.g., based on computed probabilities of an accurate match). In one embodiment, the neural network of the machine learning system 115 is a traditional convolutional neural network which consists of multiple layers of collections of one or more neurons (which are configured to process a portion of an input data). In one embodiment, the machine learning system 115 also has connectivity or access over the communication network 105 to the geographic database 109 that can store labeled or marked features (e.g., non-positioning related sensor data, crowd sourced data sets, existing map data models, area specific mobility patterns, ranked lists, respective weights or weighting schemes, etc.).

In one embodiment, the mapping platform 103 has connectivity over the communications network 105 to the services platform 121 (e.g., an OEM platform) that provides the services 123a-123n (also collectively referred to herein as services 123) (e.g., mapping services). By way of example, the services 123 may also be other third-party services (e.g., crowdsourcing services) and include mapping services, navigation services, advertising services, shared vehicle or mobility services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 121 uses the output of the mapping platform 103 (e.g. the area that the user is likely in) to provide location-based services such as navigation, mapping, advertising, other location-based services, etc.

In one embodiment, the content providers 125a-125n (also collectively referred to herein as content providers 125) may provide content or data (e.g., crowdsourced data sets, existing map data models, area specific mobility pattern data), road types and geometries, building types, heights, and attributes, area population or density models, traffic data (e.g., vehicle and pedestrian), terrain data/topology, etc. to the UEs 101, the mapping platform 103, the geographic database 109, the vehicles 111, the applications 117, the services platform 121, and the services 123. The content provided may be any type of content, such as map content, text-based content, audio content, video content, image content, etc. In one embodiment, the content providers 125 may provide content regarding the movement of a UE 101, a vehicle 111, or a combination thereof on a digital map or link as well as content that may aid in localizing a user path or trajectory on a digital map or link (e.g., to assist with determining the area that the user is likely in). In one embodiment, the content providers 125 may also store content associated with the mapping platform 103, the geographic database 109, the vehicles 111, the services platform 121, and/or the services 123. In another embodiment, the content providers 125 may manage access to a central repository of data, and offer a consistent, standard interface to data, such as a repository of the geographic database 109.

In one embodiment, a UE 101 and/or a vehicle 111 may be part of a probe-based system for collecting probe data for generating recorded crowdsourced data sets, map data models, and area specific mobility patterns. In one embodiment, each UE 101 and/or vehicle 111 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 111 may include vehicle sensors 113 for reporting measuring and/or reporting attributes. The attributes can also be any attribute normally collected by an on-board diagnostic (OBD) system of the vehicle 111, and available through an interface to the OBD system (e.g., OBD II interface or other similar interface).

In one embodiment, the probe points can be reported from the UE 101 and/or the vehicle 111 in real-time, in batches, continuously, or at any other frequency requested by the system 100 over, for instance, the communication network 105 for processing by the mapping platform 103. The probe points also can be map matched to specific road links stored in the geographic database 109. In one embodiment, the system 100 generate user or vehicle paths or trajectories from the observed and expected frequency of probe points for an individual probe so that the probe traces represent routes for all available transport modes, user historical routes, or a combination thereof through a given area (i.e., area specific mobility patterns).

In one embodiment, as previously stated, the vehicles 111 are configured with various sensors (e.g., vehicle sensors 113) for generating or collecting probe data, sensor data, related geographic/map data (e.g., routing data), etc. In one embodiment, the sensor data represents non-positioning related sensor data as well as sensor data associated with a geographic location or coordinates at which the sensor data was collected (e.g., a latitude and longitude pair). In one embodiment, the probe data (e.g., stored in or accessible via the geographic database 109) includes location probes collected by one or more vehicle sensors 113. By way of example, the vehicle sensors 113 may include a RADAR system, a LiDAR system, global positioning sensor for gathering location data (e.g., GPS), GNSS-compatible equipment, a network detection sensor for detecting wireless signals or receivers for different short-range communications (e.g., Bluetooth, Wi-Fi, Li-Fi, NFC, etc.), temporal information sensors, a camera/imaging sensor for gathering image data, an audio recorder for gathering audio data, velocity sensors mounted on a steering wheel of the vehicles 111, switch sensors for determining whether one or more vehicle switches are engaged (e.g., driving lights on), and the like. Though depicted as automobiles, it is contemplated the vehicles 111 can be any type of private, public, or shared manned or unmanned vehicle (e.g., cars, trucks, buses, vans, motorcycles, scooters, bicycles, drones, etc.) that can traverse an area (e.g., a city, a district, a neighborhood, etc.).

Other examples of sensors 113 of a vehicle 111 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 111 along a path of travel, moisture sensors, pressure sensors, etc. In a further example embodiment, vehicle sensors 113 about the perimeter of a vehicle 111 may detect the relative distance of the vehicle 111 from a physical divider, a lane line of a link or roadway, the presence of other vehicles, pedestrians, traffic lights, potholes and any other objects, or a combination thereof. In one scenario, the vehicle sensors 113 may detect contextually available information such as weather data, traffic information, or a combination thereof. In one embodiment, a vehicle 111 may include GPS or other satellite-based receivers 119 to obtain geographic coordinates from satellites 119 for determining current location and time in relation to a reference mobility pattern. Further, the location can be determined by visual odometry, triangulation systems such as A-GPS, Cell of Origin, or other location extrapolation technologies.

In one embodiment, the UEs 101 may also be configured with various sensors (e.g., device sensors 107) for acquiring and/or generating probe data and/or sensor data associated with a user, a vehicle 111 (e.g., a driver or a passenger), other vehicles, attributes or characteristic of a given area (e.g., a city, a district, a neighborhood, etc.). For example, the device sensors 107 may be used as GPS receivers (when user enabled) for interacting with the one or more satellites 119 to determine a user location (origin) as well as to track the current speed, position and location of a user or a vehicle 111 travelling along a link or on a road segment (e.g., when recording area specific mobility patterns). In addition, the device sensors 107 may gather tilt data (e.g., a degree of incline or decline of a vehicle 111 during travel), motion data, light data, sound data, image data, weather data, temporal data, and other data associated with the vehicles 111 and/or UEs 101. Still further, the device sensors 107 may detect local or transient network and/or wireless signals (e.g., transaction information), such as those transmitted by nearby devices during navigation along a roadway (Li-Fi, NFC) and/or making payments using a UE 101, etc.

It is noted therefore that the above described data may be transmitted via the communication network 105 as probe data according to any known wireless communication protocols. For example, each UE 101, application 107, user, and/or vehicle 111 may be assigned a unique probe identifier (probe ID) for use in reporting or transmitting said probe data collected by the vehicles 111 and/or UEs 101. In one embodiment, each vehicle 111 and/or UE 101 is configured to report probe data as probe points, which are individual data records collected at a point in time that records telemetry data.

In one embodiment, the mapping platform 103 retrieves aggregated probe points gathered and/or generated by the device sensors 107 and/or vehicle sensors 113 resulting from the travel of the UEs 101 and/or vehicles 111 on a road segment of a road network of a digital map (e.g., as the part of the process of generating area specific mobility graphs). In one instance, the geographic database 109 stores a plurality of probe points and/or trajectories generated by different UEs 101, device sensors 107, vehicles 111, vehicle sensors 113, and applications 117, etc. over a period while traveling in a large monitored area (e.g., a city). A time sequence of probe points specifies a trajectory—i.e., a path traversed by a UE 101, a vehicle 111, an application 117, etc. over the period.

In one embodiment, the communication network 105 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof In one embodiment, the mapping platform 103 may be a platform with multiple interconnected components. The mapping platform 103 may include multiple servers, intelligent networking devices, computing devices, components, and corresponding software for providing parametric representations of lane lines. In addition, it is noted that the mapping platform 103 may be a separate entity of the system 100, a part of the services platform 121, a part of the one or more services 123, or included within a vehicle 111 (e.g., an embedded navigation system).

In one embodiment, the geographic database 109 can store information regarding non-positioning related sensor data, map data and related attributes, area specific layouts and attributes, area specific mobility related patterns, known traces of users or UEs 101, crowdsourced reference tracks, reference data associated with a non-specific location, reference mobility patterns, etc. In one instance, the geographic database 109 can store area (e.g., city) ranking factors and attributes, probability factors, ranking or probability threshold values, weights and/or weighting schemes, labeled and/or marked features and attributes, etc. The information may be any of multiple types of information that can provide means for determining a non-specific device location according to an observed mobility pattern derived from non-positioning related sensors. In another embodiment, the geographic database 109 may be in a cloud and/or in a UE 101, a vehicle 111, or a combination thereof.

By way of example, the UEs 101, mapping platform 103, device sensors 107, vehicles 111, vehicle sensors 113, applications 117, satellites 119, services platform 121, services 123, and/or content providers 125 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 6:
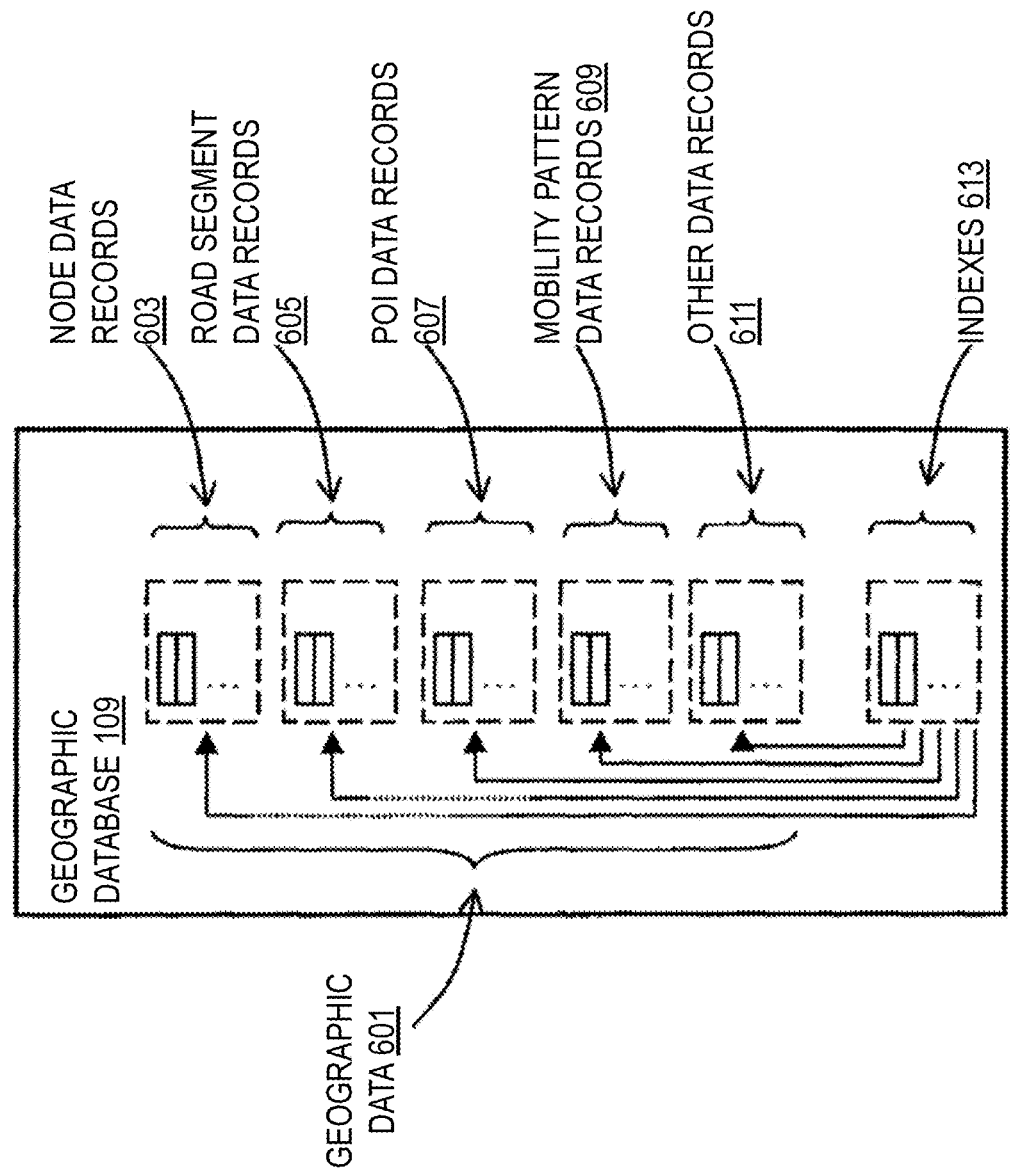
FIG. 6 is a diagram of a geographic database, according to example embodiment(s)

FIG. 6 is a diagram of a geographic database, according to example embodiment(s). In one embodiment, the geographic database 109 includes geographic data 601 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 603, road segment or link data records 605, POI data records 607, mobility pattern data records 609, other records 611, and indexes 613, for example. More, fewer, or different data records can be provided. In one embodiment, additional data records (not shown) can include cartographic ("carto") data records, routing data, and maneuver data. In one embodiment, the indexes 613 may improve the speed of data retrieval operations in the geographic database 109. In one embodiment, the indexes 613 may be used to quickly locate data without having to search every row in the geographic database 109 every time it is accessed. For example, in one embodiment, the indexes 613 can be a spatial index of the polygon points associated with stored feature polygons.

In exemplary embodiments, the road segment data records 605 are links or segments representing roads, streets, or paths (e.g., that are unique to an area) that can be used in the mobility pattern comparison for determining a non-specific device location according to an observed mobility pattern derived from non-positioning related sensors. The node data records 603 are end points corresponding to the respective links or segments of the road segment data records 605. The road link data records 605 and the node data records 603 represent a road network, such as used by vehicles 111 and/or other entities. Alternatively, the geographic database 109 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 607. In one embodiment, the POI data records 607 can include data regarding building types, heights, floors, stories, means or modes of internal movement (e.g., elevators, escalators, moving sidewalks, stairs, etc.) and various other attributes. The geographic database 109 can also include data about places, such as cities, towns, or other communities, and other geographic features, such as bodies of water, mountain ranges, etc. Such place or feature data can be part of the POI data records 607 or can be associated with POIs or POI data records 607 (such as a data point used for displaying or representing a portion of a city).

In one embodiment, the geographic database 109 includes mobility pattern data records 609 (e.g., observed mobility pattern data, reference mobility pattern data, area specific mobility pattern data, etc.) related to a UE 101 (e.g., a mobile device, a smartphone, etc.), a vehicle 111 (e.g., a standard vehicle, an autonomous vehicle, a semi-autonomous vehicle, etc.), or a combination thereof. By way of example, the reference mobility pattern data may be previously recorded data, crowdsourced data, or a combination thereof. In one instance, the mobility pattern data records 609 may also include user mobility graph/user mobility patterns, road attributes, traffic data (e.g., vehicle and pedestrian), parking conditions and/or restrictions, ranking or probability weights or weighting schemes, labeled and/or marked features and attributes, and/or any other related data. In one embodiment, the mobility pattern data records 609 can be associated with one or more of the node data records 603, road segment or link records 605, and/or POI data records 607; or portions thereof (e.g., smaller or different segments than indicated in the road segment records 605) to determine a non-specific device location according to an observed mobility pattern derived from non-positioning related sensors (e.g., device sensors 107).

In one embodiment, the geographic database 109 can be maintained by the services platform 121 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle along roads throughout an area of interest to observe features (e.g., road types and geometries, etc.) and/or record information about them, for example. Similarly, the map developer can employ field personnel to travel by foot throughout an area of interest to observe non-vehicular related features (e.g., building types, heights, attributes, etc.). Also, remote sensing, such as aerial or satellite photography, can be used.

In one embodiment, the geographic database 109 include high resolution or high definition (HD) mapping data that provide centimeter-level or better accuracy of map features. For example, the geographic database 109 can be based on LiDAR or equivalent technology to collect billions of 3D points and model road surfaces and other map features down to the number lanes and their widths. In one embodiment, the HD mapping data capture and store details such as the slope and curvature of the road, lane markings, roadside objects such as signposts, including what the signage denotes. By way of example, the HD mapping data enable highly automated vehicles 111 to precisely localize themselves on a road, and to determine the road attributes (e.g., direction of traffic) at high accuracy levels.

In one embodiment, the geographic database 109 is stored as a hierarchical or multi-level tile-based projection or structure. More specifically, in one embodiment, the geographic database 109 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, a device sensor 107, a vehicle 111, and/or a vehicle sensor 113. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining a non-specific device location according to an observed mobility pattern derived from non-positioning related sensors may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
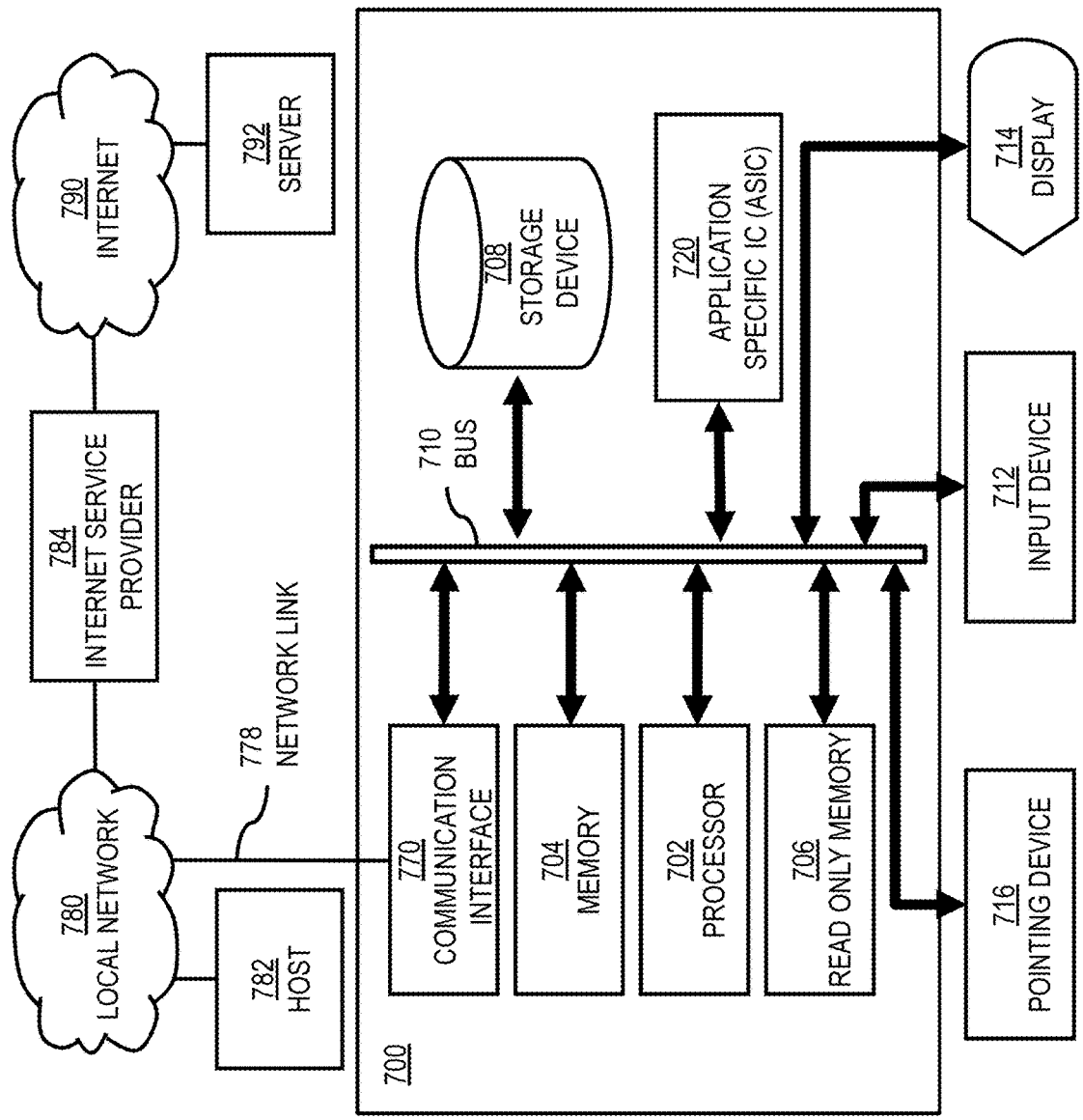
FIG. 7 is a diagram of hardware that can be used to implement example embodiment(s)

FIG. 7 illustrates a computer system 700 upon which example embodiment(s) of the invention may be implemented. Computer system 700 is programmed (e.g., via computer program code or instructions) to determine a non-specific device location according to an observed mobility pattern derived from non-positioning related sensors as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to determining a non-specific device location according to an observed mobility pattern derived from non-positioning related sensors. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random-access memory (RAM) or other dynamic storage device, stores information including processor instructions for determining a non-specific device location according to an observed mobility pattern derived from non-positioning related sensors. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for determining a non-specific device location according to an observed mobility pattern derived from non-positioning related sensors, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners, and external disks. In general, the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic, or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for determining a non-specific device location according to an observed mobility pattern derived from non-positioning related sensors.

The term computer-readable medium is used herein to refer to any medium that participates in providing information to processor 702, including instructions for execution. Such a medium may take many forms, including, but not limited to, non-volatile media, volatile media, and transmission media. Non-volatile media include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system can be deployed in various configurations within other computer systems, e.g., host 782 and server 792.

FIG. 8 illustrates a chip set 800 upon which example embodiment(s) of the invention may be implemented. Chip set 800 is programmed to determine a non-specific device location according to an observed mobility pattern derived from non-positioning related sensors as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively, or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to determine a non-specific device location according to an observed mobility pattern derived from non-positioning related sensors. The memory 805 also stores the data associated with or generated by the execution of the inventive steps.

FIG. 9 is a diagram of exemplary components of a mobile terminal 901 (e.g., a UE 101, a vehicle 111, or a component thereof) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile station functions that offer automatic contact matching. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile station 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile station 901 to determine a non-specific device location according to an observed mobility pattern derived from non-positioning related sensors. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the station. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile station 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 951 may be, but not limited to, a single memory, CD, DVD, ROM, RAM, EEPROM, optical storage, or any other non-volatile or non-transitory storage medium capable of storing digital data.

An optionally incorporated SIM card 949 carries, for instance, important information, such as the cellular phone number, the carrier supplying service, subscription details, and security information. The SIM card 949 serves primarily to identify the mobile station 901 on a radio network. The card 949 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining non-positioning related sensor data collected from one or more sensors of a device;
   processing the non-positioning related sensor data to determine an observed mobility pattern;
   making a determination that the observed mobility pattern corresponds to reference data associated with a non-specific location, the non-specific location being at a designated location specificity level; and
   based at least on the determination, providing an output indicating that the device is located at the non-specific location.

2. The method of claim 1, wherein the non-specific location being at a designated location specificity level comprises the non-specific location being designated at a city-level, a district-level, or a neighborhood-level.

3. The method of claim 1, wherein the non-specific location data represents one or more of a location name or a location category.

4. The method of claim 1, wherein the reference data includes one or more reference mobility patterns previously associated with the non-specific location, and wherein the non-specific location is determined by matching the observed mobility pattern to at least one of the one or more reference mobility patterns.

5. The method of claim 4, wherein the one or more reference mobility patterns are crowd-sourced from one or more other devices associated with the non-specific location, traveling in a geographic area associated with the non-specific location, or a combination thereof.

6. The method of claim 1, wherein the reference data includes map data associated with the non-specific location, and wherein the determination that the observed mobility pattern corresponds to the reference data is determined by matching the observed mobility pattern to a pattern represented by the map data.

7. The method of claim 6, wherein the map data includes road data, building data, traffic data, other map feature data, or a combination thereof.

8. The method of claim 1, further comprising:
   computing a ranked list of one or more candidate non-specific locations based at least on the determination, wherein the non-specific location is determined from the ranked list.

9. The method of claim 1, further comprising:
   computing probability data for the observed mobility pattern corresponding to the reference data,
   wherein the non-specific location is determined based on the probability data.

10. The method of claim 1, further comprising:
    updating the non-specific location based on new non-positioning related sensor data collected from the one or more sensors of the device, new reference data associated with the non-specific location, or a combination thereof.

11. The method of claim 1, wherein the output enables a personalized service to be provided via the device.

12. The method of claim 11, wherein the personalized service requires a location at least at a certain location specificity level, and wherein the designated location specificity level meets the certain location specificity level.

13. An apparatus comprising:
    at least one processor; and
    at least one memory including computer program code for one or more programs,
    the at least one memory and the computer program code configured to, with the at least one processor, cause the apparatus to perform at least the following operations:
    determine non-positioning related sensor data collected from one or more sensors of a device;
    process the non-positioning related sensor data to determine an observed mobility pattern;
    make a determination that the observed mobility pattern corresponds to reference data associated with a non-specific location, the non-specific location being at a designated location specificity level; and
    based at least on the determination, provide an output indicating that the device is located at the non-specific location.

14. The apparatus of claim 13, wherein the non-specific location being at a designated location specificity level comprises the non-specific location being designated at a city-level, a district-level, or a neighborhood-level.

15. The apparatus of claim 13, wherein the non-specific location data represents one or more of a location name or a location category.

16. The apparatus of claim 13, wherein the reference data includes one or more reference mobility patterns previously associated with the non-specific location, and wherein the non-specific location is determined by matching the observed mobility pattern to at least one of the one or more reference mobility patterns.

17. The apparatus of claim 16, wherein the one or more reference mobility patterns are crowd-sourced from one or more other devices associated with the non-specific location, traveling in a geographic area associated with the non-specific location, or a combination thereof.

18. The apparatus of claim 13, wherein the reference data includes map data associated with the non-specific location, and wherein the determination that the observed mobility pattern corresponds to the reference data is determined by matching the observed mobility pattern to a pattern represented by the map data.

19. A non-transitory computer-readable storage medium having stored thereon one or more program instructions which, when executed by one or more processors, cause an apparatus to at least perform the following operations:
- determining non-positioning related sensor data collected from one or more sensors of a device;
- processing the non-positioning related sensor data to determine an observed mobility pattern;
- making a determination that the observed mobility pattern corresponds to one or more reference mobility patterns previously associated with a non-specific location, the non-specific location being at a designated location specificity level; and
- based at least on the determination, providing an output indicating that the device is located at the non-specific location.

20. The non-transitory computer-readable storage medium of claim 19, wherein the designated location specificity level comprises privacy protection for the device.

* * * * *